(12) United States Patent
Zhong et al.

(10) Patent No.: US 12,538,339 B2
(45) Date of Patent: Jan. 27, 2026

(54) METHOD AND APPARATUS FOR SENDING AUXILIARY INFORMATION, METHOD AND APPARATUS FOR RECEIVING AUXILIARY INFORMATION, TERMINAL, AND NETWORK SIDE DEVICE

(71) Applicant: VIVO MOBILE COMMUNICATION CO., LTD., Guangdong (CN)

(72) Inventors: Tingting Zhong, Guangdong (CN); Yumin Wu, Guangdong (CN)

(73) Assignee: VIVO MOBILE COMMUNICATION CO., LTD., Guangdong (CN)

(*) Notice: Subject to any disclaimer, the term of this patent is extended or adjusted under 35 U.S.C. 154(b) by 408 days.

(21) Appl. No.: 18/157,895

(22) Filed: Jan. 23, 2023

(65) Prior Publication Data

US 2023/0156756 A1    May 18, 2023

Related U.S. Application Data

(63) Continuation of application No. PCT/CN2021/107915, filed on Jul. 22, 2021.

(30) Foreign Application Priority Data

Jul. 24, 2020    (CN) ......................... 202010725500.7

(51) Int. Cl.
*H04W 72/51*    (2023.01)
*H04W 72/543*   (2023.01)

(52) U.S. Cl.
CPC ......... *H04W 72/51* (2023.01); *H04W 72/543* (2023.01)

(58) Field of Classification Search
CPC ... H04W 72/51; H04W 72/543; H04W 72/21; H04W 72/115; H04W 72/0446;
(Continued)

(56) References Cited

U.S. PATENT DOCUMENTS

2019/0222293 A1   7/2019   Lee et al.
2020/0107396 A1   4/2020   Wang et al.
(Continued)

FOREIGN PATENT DOCUMENTS

CN   107155218 A   9/2017
CN   108834090 A   11/2018
(Continued)

OTHER PUBLICATIONS

Huawei Hisilicon "Uplink transmission in dedicated pre-configured resource" 3GPP TSG-RAN WG2 meeting #104, Nov. 12, 2018, pp. 5.
(Continued)

*Primary Examiner* — Ayaz R Sheikh
*Assistant Examiner* — Mang Boi Thawng
(74) *Attorney, Agent, or Firm* — Fredrikson & Byron, P.A.

(57) ABSTRACT

This application discloses a method and an apparatus for sending auxiliary information, a method and an apparatus for receiving auxiliary information, a terminal, and a network side device, and belongs to the field of communication technologies. The method for sending auxiliary information includes: sending auxiliary information for a target configuration to a network side device, where the target configuration is a configuration related to transmission of a preconfigured physical uplink shared channel PUSCH resource.

18 Claims, 5 Drawing Sheets

(58) Field of Classification Search
CPC ..... H04L 5/006; H04L 5/0044; H04L 5/0091; H04L 5/0026; H04L 1/1812; H04L 5/003
See application file for complete search history.

(56) References Cited

U.S. PATENT DOCUMENTS

| | | | | |
|---|---|---|---|---|
| 2020/0170069 | A1* | 5/2020 | Shih | H04W 76/27 |
| 2021/0014864 | A1* | 1/2021 | Phuyal | H04W 72/53 |
| 2021/0360544 | A1* | 11/2021 | Chen | H04L 5/0078 |
| 2021/0400567 | A1* | 12/2021 | Sha | H04W 72/21 |
| 2022/0038997 | A1* | 2/2022 | Höglund | H04W 48/06 |
| 2022/0167452 | A1* | 5/2022 | Chang | H04W 12/041 |
| 2022/0174599 | A1* | 6/2022 | Kuang | H04W 52/0232 |
| 2023/0052503 | A1* | 2/2023 | Peng | H04W 72/543 |
| 2023/0171765 | A1* | 6/2023 | Hong | H04W 72/1268 370/329 |
| 2023/0362965 | A1* | 11/2023 | Phuyal | H04W 72/21 |

FOREIGN PATENT DOCUMENTS

| | | |
|---|---|---|
| CN | 110786055 A | 2/2020 |
| CN | 110972255 A | 4/2020 |
| CN | 111278091 A | 6/2020 |
| CN | 111436084 A | 7/2020 |
| EP | 4132183 A1 | 2/2023 |
| JP | 2019509665 A | 4/2019 |
| JP | 2023534543 A | 8/2023 |
| WO | 2020034571 A1 | 2/2020 |
| WO | 2020145780 A1 | 7/2020 |
| WO | 2022022543 A1 | 2/2022 |

OTHER PUBLICATIONS

Ericsson "PUR Configuration—Remaining open issues" 3GPP TSG-RAN WG2 #107bis, Oct. 14, 2019, pp. 8.
Huawei, Hisilicon "Discussion on procedure of assistance information reporting" 3GPP TSG-RAN2 Meeting#106, May 13, 2019, pp. 3.
Nokia, Nokia Shanghai Bell "Signaling Aspects for D-PUR", 3GPP TSG RAN WG2 Meeting #105, Feb. 25, 2019, pp. 5.
European Patent Office "Extended European Search Report" from Application No. 21846751.2, dated Nov. 24, 2023, pp. 11.
International Patent Application No. PCT/CN2021/107915, International Search Report and Written Opinion with Partial English Machine Translation mailed Oct. 9, 2021, 8 pages.

* cited by examiner

METHOD AND APPARATUS FOR SENDING AUXILIARY INFORMATION, METHOD AND APPARATUS FOR RECEIVING AUXILIARY INFORMATION, TERMINAL, AND NETWORK SIDE DEVICE

CROSS-REFERENCE TO RELATED APPLICATIONS

This application is a continuation of International Application No. PCT/CN2021/107915, filed on Jul. 22, 2021, which claims priority to Chinese Patent Application No. 202010725500.7 filed in China on Jul. 24, 2020, which are incorporated herein by reference in their entireties.

TECHNICAL FIELD

This application belongs to the field of communication technologies, and in particular, relates to a method and an apparatus for sending auxiliary information, a method and an apparatus for receiving auxiliary information, a terminal, and a network side device.

BACKGROUND

A network side device may preconfigure an uplink resource for a terminal. The uplink resource may be referred to as a preconfigured uplink resource (PUR). However, the network side device does not know whether the terminal needs the preconfigured uplink resource, nor does it know content of a preconfigured uplink resource required by the terminal. As a result, an uplink resource configured on a network side device may not satisfy a demand of the terminal.

SUMMARY

According to a first aspect of the present disclosure, a method for sending auxiliary information is provided. The method is applied to a terminal and includes:
  sending auxiliary information for a target configuration to a network side device, where the target configuration is a configuration related to transmission of a preconfigured physical uplink shared channel PUSCH resource.

According to a second aspect of the present disclosure, an apparatus for sending auxiliary information is provided. The apparatus is applied to a terminal and includes:
  a sending module, configured to send auxiliary information for a target configuration to a network side device, where the target configuration is a configuration related to transmission of a preconfigured physical uplink shared channel PUSCH resource.

According to a third aspect of the present disclosure, a method for receiving auxiliary information is provided. The method is applied to a network side device and includes:
receiving auxiliary information sent by a terminal for a target configuration, where the target configuration is a configuration related to transmission of a preconfigured physical uplink shared channel PUSCH resource.

According to a fourth aspect of the present disclosure, an apparatus for receiving auxiliary information is provided. The apparatus is applied to a network side device and includes:
  a receiving module, configured to receive auxiliary information sent by a terminal for a target configuration, where the target configuration is a configuration related to transmission of a preconfigured physical uplink shared channel PUSCH resource.

According to a fifth aspect of the present disclosure, a terminal is provided. The terminal includes a processor, a memory, and a program or an instruction stored in the memory and executable by the processor, where the program or instruction, when executed by the processor, implements the steps of the method according to the first aspect.

According to a sixth aspect of the present disclosure, a network side device is provided. The network side device includes a processor, a memory, and a program or an instruction stored in the memory and executable by the processor, where the program or instruction, when executed by the processor, implements the steps of the method according to the third aspect.

According to a seventh aspect of the present disclosure, a readable storage medium is provided. The readable storage medium stores a program or an instruction, where the program or instruction, when executed by a processor, implements the steps of the method according to the first aspect or implements the steps of the method according to the third aspect.

According to an eighth aspect of the present disclosure, a chip is provided. The chip includes a processor and a communications interface, where the communications interface is coupled to the processor, and the processor is configured to run a program or an instruction of a network side device, to implement the method according to the first aspect or implement the method according to the third aspect.

According to a ninth aspect of the present disclosure, a computer software product is provided. The computer software product is stored in a non-volatile storage medium, and is configured to be executed by at least one processor, to implement the steps of the method according to the first aspect or implement the steps of the method according to the third aspect.

According to a tenth aspect of the present disclosure, a communications device is provided. The communications device is configured to perform the method according to the first aspect or perform the method according to the third aspect.

DESCRIPTION OF EMBODIMENTS

The following clearly describes the technical solutions in the embodiments of this application with reference to the accompanying drawings in the embodiments of this application. Apparently, the described embodiments are some but not all of the embodiments of this application. All other embodiments obtained by a person of ordinary skill in the art based on the embodiments of this application without creative efforts shall fall within the protection scope of this application.

The terms "first", "second", and the like in the specification and claims of this application are used to distinguish between similar objects instead of describing a specific order or sequence. It should be understood that, data termed in such a way is interchangeable in proper circumstances, so that the embodiments of this application can be implemented in an order other than the order illustrated or described herein. Objects classified by "first" and "second" are usually of a same type, and the quantity of objects is not limited. For example, there may be one or more first objects. In addition, in the specification and the claims, "and/or" represents at least one of connected objects, and a character "/" generally represents an "or" relationship between associated objects.

It should be noted that the technology described in the embodiments of this application is not limited to a long term evolution (LTE)/LTE-Advanced (LTE-A) system, and can also be used in various wireless communications systems, such as code division multiple access CDMA, time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this application may be used interchangeably. The technologies described can be applied to both the systems and the radio technologies mentioned above as well as to other systems and radio technologies. However, a new radio (NR) system is described below as an example, and the term NR is used in most of the descriptions, although these technologies can also be used in an application other than an application of the NR system, for example, a 6th generation (6G) communications system.

Figure 1:
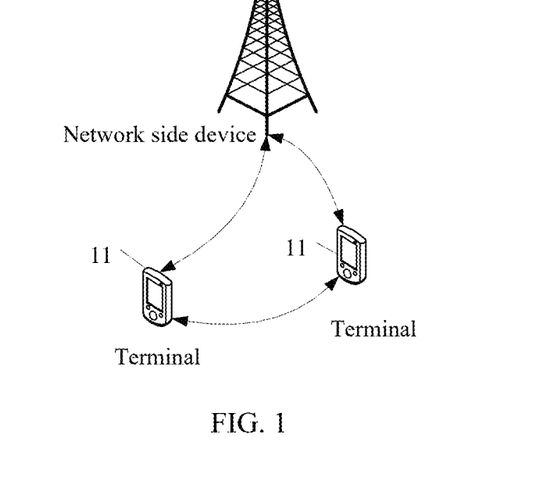
FIG. 1 is a block diagram of a wireless communications system to which an embodiment of this application is applicable.

FIG. 1 is a block diagram of a wireless communications system to which embodiments of this application can be applied. The wireless communications system includes a terminal 11 and a network side device 12. The terminal 11 may be also referred to as a terminal device or user equipment (UE). The terminal 11 may be a terminal side device such as a mobile phone, a tablet personal computer, a laptop computer or referred to as a notebook computer, a personal digital assistant (PDA), a palmtop computer, a netbook, an ultra-mobile personal computer (UMPC), a mobile Internet device (MID), a wearable device, vehicle user equipment (VUE), or pedestrian user equipment (PUE). The wearable device includes a bracelet, a headset, glasses, or the like. It should be noted that a specific type of the terminal 11 is not limited in the embodiments of this application. The network side device 12 may be a base station or a core network. The base station may be referred to as a Node B, an evolved Node B, an access point, a base transceiver station (BTS), a radio base station, a radio transceiver, a basic service set (BSS), an extended service set (ESS), a Node B, an evolved Node B (evolved Node B, eNB), a home Node B, a home evolved Node B, a wireless local area network (WLAN) access point, a WiFi (wireless fidelity, WiFi) node, a transmission and reception point (TRP), or other certain appropriate terms in the art. Provided that the same technical effects are achieved, the base station is not limited to specific technical vocabulary. It should be noted that in the embodiments of this application, a base station in the NR system is merely used as an example, but does not limit a specific type of the base station.

With reference to the accompanying drawings, the following describes in detail a method and an apparatus for sending auxiliary information, a method and an apparatus for receiving auxiliary information, a terminal, and a network side device in the embodiments of this application based on specific embodiments and application scenarios thereof.

Figure 2:
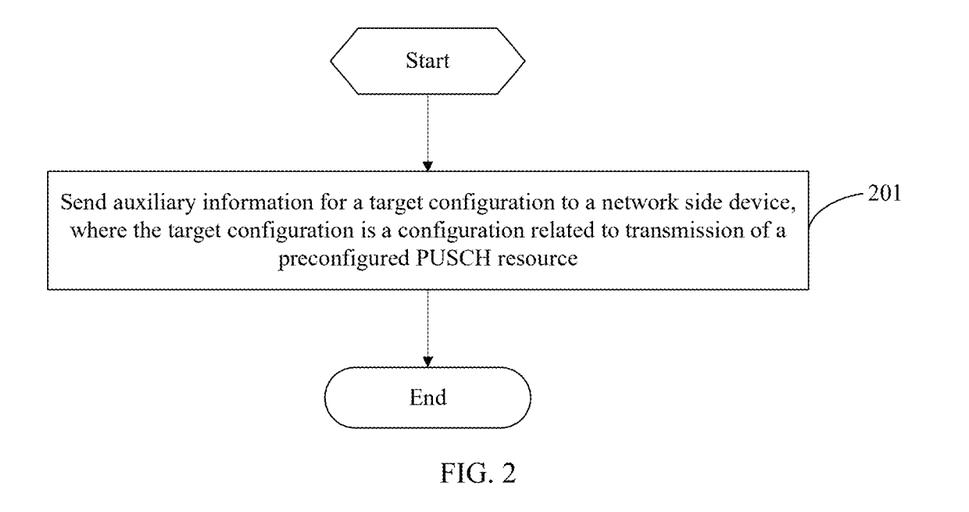
FIG. 2 is a flowchart of a method for sending auxiliary information according to an embodiment of this application.

FIG. 2 is a flowchart of a method for sending auxiliary information according to an embodiment of this application. As shown in FIG. 2, the method for sending auxiliary information is applied to a terminal and includes the following steps:

Step 201: Send auxiliary information for a target configuration to a network side device, where the target configuration is a configuration related to transmission of a preconfigured physical uplink shared channel PUSCH resource.

In this embodiment of this application, the target configuration may be understood as a configuration related to transmission of an uplink resource preconfigured by the network side device. Alternatively, the target configuration may be a configuration related to transmission of a preconfigured physical uplink shared channel (PUSCH) resource. For example, the target configuration may be similar to PUR-Config in LTE. For another example, the target configuration may be a configuration related to a transmission mode of a preconfigured PUSCH resource for small data transmission (SDT) in NR. In addition to the above target configuration, there may be another target configuration. This is not limited in this embodiment of this application.

The following briefly describes an NR SDT data service.

The NR SDT data service may be understood as a service of small and infrequent data. For example, an NR SDT data service in an application of a smartphone may include data of an instant messaging service, heart-beat/keep-alive data of an instant messaging (IM)/email client and another application, push notifications of various applications, and the like. For another example, an NR SDT data service in an application of a dumbphone may include periodic positioning messages of a wearable device, data of a sensor, data of a smart water meter, and the like. The NR SDT data service may alternatively be sporadic low-throughput short data and the like.

In this embodiment of this application, the terminal sends the auxiliary information to the network side device, so that the network side device can configure an uplink resource according to the auxiliary information. Therefore, the auxiliary information can assist the network side device in better configuring the uplink resource, thereby enabling the uplink resource configured by the network side device to better satisfy a demand of the terminal.

Optionally, before the sending auxiliary information for a target configuration to a network side device, the method further includes:

receiving configuration information sent by the network side device, where the configuration information is used to indicate whether the terminal is allowed to report the auxiliary information; and the auxiliary information is sent in a case that the configuration information indicates that the terminal is allowed to report the auxiliary information.

In this embodiment of this application, the network side device may send the configuration information to the terminal. The configuration information may be used to indicate whether the terminal is allowed to report the auxiliary information. In this way, in a case that the terminal receives the configuration information sent by the network side device and used to indicate that the terminal is allowed to report the auxiliary information, the terminal can send the auxiliary information to the network side device on an appropriate occasion. However, if the terminal receives the configuration information sent by the network side device and used to indicate that the terminal is not allowed to report the auxiliary information, the terminal may not send the auxiliary information to the network side device.

It should be noted that the above configuration information may directly indicate whether the terminal is allowed to report the auxiliary information, or indirectly indicate whether the terminal is allowed to report the auxiliary information.

Optionally, the configuration information includes a target bit, where the target bit is used to indicate whether the terminal is allowed to report the auxiliary information; and/or the configuration information includes information about a target timer, where the target timer is configured to indicate whether the terminal is allowed to report the auxiliary information.

The target bit may be one bit, and may directly indicate whether the terminal is allowed to report the auxiliary information, or indirectly indicate whether the terminal is allowed to report the auxiliary information. The target timer may be one timer, and may directly indicate whether the terminal is allowed to report the auxiliary information.

Optionally, the sending auxiliary information for a target configuration to a network side device includes:

sending the auxiliary information for the target configuration to the network side device in a case that an initiation condition is satisfied.

Optionally, the initiation condition includes at least one of the following: the network side device allows the terminal to send the auxiliary information; the terminal is interested in the target configuration;
the terminal is not interested in the target configuration;
the terminal is no longer interested in the target configuration;
the terminal is interested in a first transmission mode, where the first transmission mode is a transmission mode related to the target configuration;
the terminal is not interested in the first transmission mode;
the terminal is no longer interested in the first transmission mode;
the target configuration does not match a service feature of the terminal;
a medium access control (MAC) protocol data unit (PDU) of uplink data is less than or equal to a transport block size (TBS) configured based on a type of the terminal; and
a state of the terminal is a target state, where the target state is a radio resource control (RRC) connected state or a non-RRC connected state, or the target state is only the RRC connected state, or the target state is only the non-RRC connected state.

The first transmission mode is a transmission mode related to the target configuration. For example, the first transmission mode may be an LTE PUR transmission mode; or may be a transmission mode of a preconfigured PUSCH resource for SDT in NR. This is not limited in this embodiment of this application.

In the above initiation condition, that the target configuration does not match a service feature of the terminal may be understood as follows: At least one configuration in the target configuration does not match the service feature of the terminal. In other words, that the target configuration does not match a service feature of the terminal may include the following two cases: Some configurations in the target configuration do not match the service feature of the terminal; and all configurations in the target configuration do not match the service feature of the terminal.

In the above initiation condition, the target state in which the terminal reports the auxiliary information may be preconfigured by the network side device, or may be specified in a protocol. If the target state is merely the RRC connected state, the terminal may report the auxiliary information to the network side device only when in the RRC connected state, but cannot report the auxiliary information to the network side device when in the non-RRC connected state. If the target state is merely the non-RRC connected state, the terminal may report the auxiliary information to the network side device only when in the non-RRC connected state, but cannot report the auxiliary information to the network side device when in the RRC connected state. If the target state is the RRC connected state or the non-RRC connected state, the terminal may report the auxiliary information to the network side device when in either the RRC connected state or the non-RRC connected state.

As an example, the initiation condition may be that the terminal is interested in a configuration of the preconfigured PUSCH resource, or that the terminal is interested in a transmission mode of the preconfigured PUSCH resource. As another example, the initiation condition may be that the terminal is not interested in or is no longer interested in a configuration of the preconfigured PUSCH resource, or that the terminal is not interested in or is no longer interested in a transmission mode of the preconfigured PUSCH resource for SDT. As still another example, the initiation condition may be that a configuration of an existing preconfigured PUSCH resource does not match or is not suitable for a service of the terminal, that is, at least one configuration in the target configuration does not match the service feature of the terminal.

Optionally, the auxiliary information includes first auxiliary information and/or second auxiliary information in a case that the terminal needs the target configuration. The first auxiliary information is used to indicate a tendentious configuration of the terminal for the target configuration, and the second auxiliary information is used to indicate service status of the terminal.

In this implementation, that the terminal needs the target configuration may include a case that the terminal actively needs the target configuration. For example, the terminal is interested in the target configuration. For another example, the terminal is interested in the transmission mode (namely, the first transmission mode) related to the target configuration. Alternatively, the terminal may passively need or be forced to need the target configuration. In other words, the network side device considers that the terminal needs the target configuration. For example, the terminal is not interested in the target configuration or the transmission mode related to the target configuration, but the network side device considers that the terminal needs the target configuration.

Both the first auxiliary information and the second auxiliary information may be understood as content of the auxiliary information. When the terminal initiates reporting of the auxiliary information, the content of the auxiliary information may be specified through an RRC layer of the terminal, and then the auxiliary information may be submitted to an underlying protocol entity for transmission.

In this implementation, the first auxiliary information is used to indicate the tendentious configuration (or referred to as a preferred configuration) of the terminal for the target configuration. The tendentious configuration may be understood as a result of the target configuration. In other words, the terminal expects the network side device to configure the target configuration according to the tendentious configuration, and enables, by sending the first auxiliary information to the network side device, the network side device to be aware of the terminal's tendentious configuration for the target configuration. Therefore, the network side device is enabled to configure the target configuration according to the first auxiliary information.

The second auxiliary information is used to indicate the service status of the terminal. The network side device is enabled to be aware of the service status of the terminal after the second auxiliary information is sent to the network side device, so that the network side device can reasonably configure the target configuration according to the service status of the terminal.

A quantity of pieces of each of the first auxiliary information and the second auxiliary information may be one or more.

Specific content of the first auxiliary information and the second auxiliary information is described below respectively.

Optionally, the first auxiliary information includes at least one of a target configuration identifier, a service identifier, a service pattern identifier, a configuration parameter, and first transmission bearer information.

This embodiment provides the content of the first auxiliary information.

The target configuration identifier may be, for example, PUSCH configuration 1.

The service identifier may be, for example, service 1.

The service pattern identifier may be, for example, traffic pattern 1.

It should be noted that both the service identifier and the service pattern identifier are used to indicate a specific service type or service pattern, and have the same or similar meanings. Therefore, the first auxiliary information may include both the service identifier and the service pattern identifier, or only any one of the service identifier and the service pattern identifier.

Optionally, the configuration parameter includes at least one of a TBS, a quantity of PUSCH occasions (PUSCH occasions), a period of a PUSCH occasion, time offset for the first PUSCH occasion, a bandwidth part (BWP) identifier, and a quantity of hybrid automatic repeat requests (HARQ).

The unit of the period of the PUSCH occasion may be any case. The unit of the time offset for the first PUSCH occasion (time offset for the first PUSCH occasion) may also be any case. The BWP identifier may be, for example, activated BWP 1.

Optionally, the first transmission bearer information includes at least one of a radio bearer identifier, a logical channel identifier, a data flow identifier, a session identifier, and a cell group identifier.

The radio bearer identifier may be, for example, data radio bearer 1 (Data Radio bearer 1, DRB1). The logical channel identifier may be, for example, logical channel identifier 1 (Logical Channel ID 1, LCID 1). The data flow identifier may be, for example, QoS flow 1. The session identifier may be, for example, PDU session 1. The cell group identifier may be, for example, master cell group (MCG) or secondary cell group (SCG).

Optionally, the second auxiliary information includes at least one of Quality of Service (Quality of Service, QoS) requirement information and service status information.

A quantity of pieces of each of the QoS requirement information and the service status information may be one or more.

Optionally, the QoS requirement information includes at least one of a service identifier, a service pattern identifier, QoS description information, and second transmission bearer information; and the second transmission bearer information is used to indirectly indicate a QoS requirement of the terminal.

The service identifier may be, for example, service identifier (identifier, ID) 1. The service pattern identifier may be, for example, traffic pattern 1. The QoS description information (QoS profile) may be, for example, description information such as low delay and high reliability.

Optionally, the second transmission bearer information includes at least one of a radio bearer identifier, a data flow identifier, a session identifier, and a logical channel identifier.

The radio bearer identifier may be, for example, data radio bearer 1 (Data Radio bearer 1, DRB1). The data flow identifier may be, for example, QoS flow 1. The session identifier may be, for example, PDU session 1. The logical channel identifier may be, for example, logical channel identifier 1 (Logical Channel ID 1, LCID 1).

Optionally, the service status information includes at least one of a service identifier, a service pattern identifier, a service period (periodicity), a service starting time, a service ending time, a service duration time, and a service size (packet size).

The service identifier may be, for example, service ID 1. The service pattern identifier may be, for example, traffic pattern 1. The service period (or a period of the service pattern) may be any value and any time unit, for example, 5 hours.

A quantity of the service starting time (or a starting time of the service pattern) may be one or more. A quantity of the service ending time (or an ending time of the service pattern) may also be one or more. A quantity of the service duration time (or a duration time of the service pattern) may also be one or more. A quantity of the service size (or a size of the service pattern) may also be one or more.

Optionally, a quantity of each of the service starting time, the service ending time, the service duration time, and the service size is one or more.

When the quantity of the service starting time is a complex number, the quantity of the service ending time and/or the service duration time is also a complex number, and a mapping relationship between the service starting time and the service ending time and/or the service duration time is required. For example, service starting time 1 corresponds to service ending time 1 and/or service duration time 1, and service starting time 2 corresponds to service ending time 2 and/or service duration time 2.

A time value of the service starting time may be represented in at least one of the following manners:

The time value of the service starting time is represented by an absolute time, for example, 14:00 China Standard Time (CST).

The time value of the service starting time is represented by a relative time, and a reference time thereof may be any time, for example, 00:00 CST.

When the quantity of the service ending time is a complex number, the quantity of the service starting time and/or the service duration time is also a complex number, and a mapping relationship between the service ending time and the service starting time and/or the service duration time is required. For example, service ending time 1 corresponds to service starting time 1 and/or service duration time 1, and service ending time 2 corresponds to service starting time 2 and/or service duration time 2.

A time value of the service ending time may be represented in at least one of the following manners:

The time value of the service ending time is represented by an absolute time, for example, 14:00 CST.

The time value of the service ending time is represented by a relative time, and a reference time thereof may be any time, for example, 00:00 CST, or a corresponding service starting time.

When the quantity of the service duration time is a complex number, the quantity of the service starting time and/or the service ending time is also a complex number, and a mapping relationship between the service duration time and the service starting time and/or the service ending time is required. For example, service duration time 1 corresponds to service starting time 1 and/or service ending time 1, and service duration time 2 corresponds to service starting time 2 and/or service ending time 2.

A value of the service duration time may be any value and any time unit, for example, 5 minutes.

A value of the service size may be any value, and a unit of the service size may be any unit. For example, the service size is 800 bits.

The above describes the specific content of the first auxiliary information and the second auxiliary information. Because the auxiliary information includes the above content, for example, the auxiliary information includes content such as the terminal's tendentious configuration for the target configuration, QoS requirement information, service status information, and the like, the network side device can be assisted in better configuring the target resource.

Optionally, the auxiliary information includes third auxiliary information in a case that the terminal does not need the target configuration, and the third auxiliary information is used to indicate that the target configuration needs to be released.

The third auxiliary information may be an identifier used to indicate that an identifier configured for the preconfigured PUSCH resource needs to be released, for example, may be pur-ReleaseRequest.

In a case that the terminal does not need the target configuration, the terminal can enable, by sending the third auxiliary information to the network side device, the network side device to be aware that the terminal does not need the target configuration. Therefore, the network side device does not need to configure the target configuration for the terminal, thereby reducing resource overheads of the network side device in configuring the target configuration.

As an example, two specific embodiments are provided below by taking the target configuration as a configuration related to the transmission of preconfigured PUSCH resource.

Embodiment I

Figure 3:
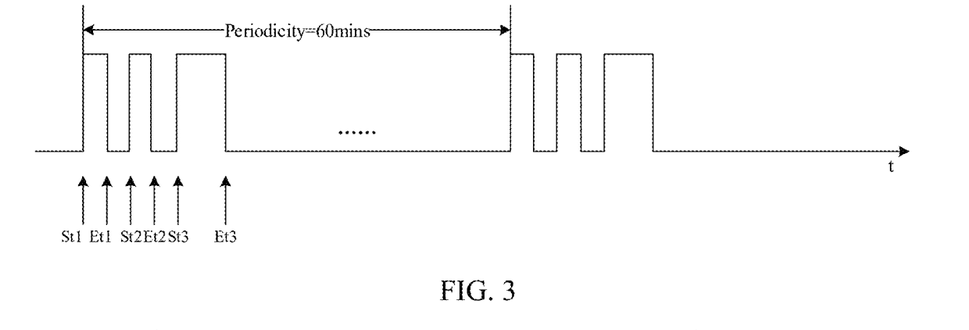
FIG. 3 and FIG. 4 are schematic diagrams of methods for sending auxiliary information according to embodiments of this application.

As shown in FIG. 3, the service pattern of the terminal is burstdata (several data packets are sent at one time, and each interval between the data packets is very short). FIG. 3 shows that three data packets are sent at one time. These three packets are St1-Et1, St2-Et2, and St3-Et3 respectively.

The network side device uses one bit (bit) in system information to indicate that the terminal is allowed to report the auxiliary information. In a case that the initiation condition of the auxiliary information is satisfied (for example, the terminal is interested in the configuration of the preconfigured PUSCH resource), the terminal sends the auxiliary information to the network side device.

The content of the auxiliary information includes the tendentious configuration related to the configuration of the preconfigured PUSCH resource, the QoS requirement information, and the service status information.

The tendentious configuration related to the configuration of the preconfigured PUSCH resource includes three preferred configurations.

The first preferred configuration includes the following content:

The identifier of the PUSCH configuration is 1.

The configuration parameter includes: the TBS being 150 bits, the quantity of the PUSCH occasion being infinite, the period of the PUSCH occasion being 8 subframes (subframes), the time offset for the first PUSCH occasion being 4 slots (slots), and the identifier of the BWP being activated BWP 1.

The transport bearer is a radio bearer. The radio bearer identifier is DRB1.

The second preferred configuration includes the following content:

The identifier of the PUSCH configuration is 2.

The configuration parameter includes: the TBS being 150 bits, the quantity of the PUSCH occasion being infinite, the period of the PUSCH occasion being 8 subframes, the time offset for the first PUSCH occasion being 6 slots, and the identifier of the BWP being activated BWP 1.

The transport bearer is a radio bearer. The radio bearer identifier is DRB1.

The third preferred configuration includes the following content:

The identifier of the PUSCH configuration is 3.

The configuration parameter includes: the TBS being 180 bits, the quantity of the PUSCH occasion being infinite, the period of the PUSCH occasion being 8 subframes, the time offset for the first PUSCH occasion being 8 slots, and the identifier of the BWP being activated BWP 1.

The transport bearer is a radio bearer. The radio bearer identifier is DRB1.

The QoS requirement information includes one QOS requirement. The QoS requirement is indirectly informed through the transport bearer. The transport bearer is a radio bearer. The radio bearer identifier is DRB1.

The service status information includes the following content:

The period (Periodicity) of the service pattern is 60 minutes (60 mins).

A quantity of the starting time of the service pattern is 3, namely, St1=09:00, St2=09:02, and St3=09:04.

A quantity of the ending time of the service pattern is 3, namely, Et1=09:01, Et2-09:03, and Et3=09:06.

A quantity of the size of the service pattern is three. Packet 1 is 20 bits (corresponding to St1 and Et1), Packet 2 is 20 bits (corresponds to St2 and Et2), and Packet 3 is 40 bits (corresponds to St3 and Et3).

Embodiment II

Figure 4:
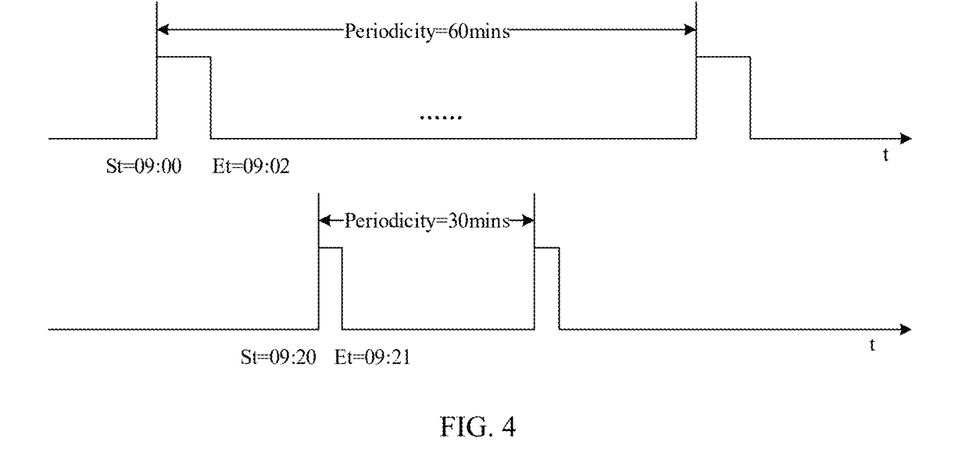

As shown in FIG. 4, when the service pattern of the terminal changes, the configuration of the preconfigured PUSCH resource needs to be updated.

The network side device uses one timer to indicate that the terminal is allowed to report the auxiliary information. In a case that the initiation condition of the auxiliary information is satisfied (for example, the terminal is interested in the transmission mode of the preconfigured PUSCH resource), the terminal sends the auxiliary information to the network side device.

The content of the auxiliary information includes the tendentious configuration related to the configuration of the preconfigured PUSCH resource, the QoS requirement information, and the service status information.

The tendentious configuration related to the configuration of the preconfigured PUSCH resource includes two preferred configurations.

The first preferred configuration includes the following content:

The identifier of the PUSCH configuration is 1.

The identifier of the service pattern is 1.

The configuration parameter includes: the TBS being 220 bits, the quantity of the PUSCH occasion being infinite, the period of the PUSCH occasion being 8 subframes, the time offset for the first PUSCH occasion being 4 slots, and the identifier of the BWP being activated BWP 1.

The transport bearer is a radio bearer. The radio bearer identifier is DRB2.

The second preferred configuration includes the following content:

The identifier of the PUSCH configuration is 2.

The identifier of the service pattern is 2.

The configuration parameter includes: the TBS being 180 bits, the quantity of the PUSCH occasion being infinite, the period of the PUSCH occasion being 6 subframes, the time offset for the first PUSCH occasion being 8 slots, and the identifier of the BWP being activated BWP 2.

The transport bearer is a radio bearer. The radio bearer identifier is DRB3.

The QoS requirement information includes two QoS requirements. A first QoS—requirement is the identifier of the service pattern being 1. The QoS requirement is indirectly informed through the transport bearer. The transport bearer is a radio bearer. The radio bearer identifier is DRB2. A second QoS requirement is the identifier of the service pattern being 2. The QoS requirement is indirectly informed through the transport bearer. The transport bearer is a radio bearer. The radio bearer identifier is DRB3.

The service status information includes information about two service patterns. Information about a first service pattern is: the identifier of the service pattern being 1, the period (Periodicity) of the service pattern being 60 minutes (60 mins), the starting time (St) of the service pattern being 09:00 CST, the ending time (Et) of the service pattern being 09:02 CST, and the size of the service pattern being 80 bits. Information about a second service pattern is: the identifier of the service pattern being 2, the period (Periodicity) of the service pattern being 30 minutes (30 mins), the starting time (St) of the service pattern being 09:20 CST, the ending time (Et) of the service pattern being 09:21 CST, and the size of the service pattern being 40 bits.

In this embodiment of this application, a terminal sends auxiliary information for a target configuration to a network side device, where the target configuration is a configuration related to transmission of an uplink resource preconfigured by the network side device. In this way, the terminal can assist, by sending the auxiliary information, the network side device in better configuring the uplink resource. Therefore, the uplink resource configured by the network side device can better satisfy a demand of the terminal.

It should be noted that, the method for sending auxiliary information provided in this embodiment of this application may be performed by an apparatus for sending auxiliary information, or by a control module that is in the apparatus for sending auxiliary information and that is configured to perform the method for sending auxiliary information. In this embodiment of this application, that the apparatus for sending auxiliary information performs the method for sending auxiliary information is used as an example to describe an apparatus for sending auxiliary information provided in an embodiment of this application.

Figure 5:
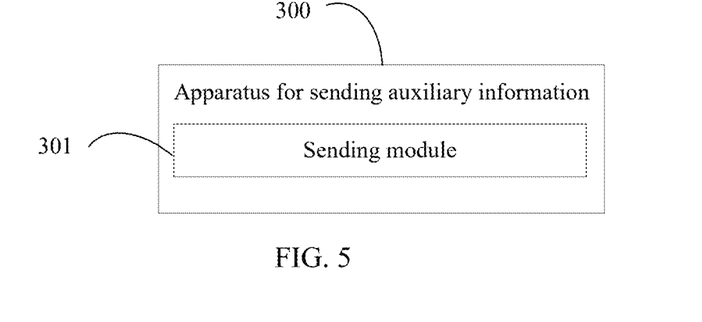
FIG. 5 is a structural diagram of an apparatus for sending auxiliary information according to an embodiment of this application.

FIG. 5 is a structural diagram of an apparatus for sending auxiliary information according to an embodiment of this application. As shown in FIG. 5, the apparatus 300 for sending auxiliary information is applied to a terminal and includes:

a sending module 301, configured to send auxiliary information for a target configuration to a network side device, where the target configuration is a configuration related to transmission of a preconfigured physical uplink shared channel PUSCH resource.

Optionally, the apparatus 300 for sending auxiliary information further includes:

a receiving module, configured to receive configuration information sent by the network side device, where the configuration information is used to indicate whether the terminal is allowed to report the auxiliary information; and the auxiliary information is sent in a case that the configuration information indicates that the terminal is allowed to report the auxiliary information.

Optionally, the configuration information includes a target bit, where the target bit is used to indicate whether the terminal is allowed to report the auxiliary information; and/or the configuration information includes information about a target timer, where the target timer is configured to indicate whether the terminal is allowed to report the auxiliary information.

Optionally, the sending module 301 is configured to:

send the auxiliary information for the target configuration to the network side device in a case that an initiation condition is satisfied.

Optionally, the initiation condition includes at least one of the following:

the network side device allows the terminal to send the auxiliary information;

the terminal is interested in the target configuration;

the terminal is not interested in the target configuration;

the terminal is no longer interested in the target configuration;

the terminal is interested in a first transmission mode, where the first transmission mode is a transmission mode related to the target configuration;

the terminal is not interested in the first transmission mode;

the terminal is no longer interested in the first transmission mode;

the target configuration does not match a service feature of the terminal;

a medium access control protocol data unit MAC PDU of uplink data is less than or equal to a transport block size TBS configured based on a type of the terminal; and a state of the terminal is a target state, where the target state is a radio resource control RRC connected state or a non-RRC connected state, or the target state is only the RRC connected state, or the target state is only the non-RRC connected state.

Optionally, the auxiliary information includes first auxiliary information and/or second auxiliary information in a case that the terminal needs the target configuration, where the first auxiliary information is used to indicate a tendentious configuration of the terminal for the target configuration, and the second auxiliary information is used to indicate service status of the terminal.

Optionally, the first auxiliary information includes at least one of a target configuration identifier, a service identifier, a service pattern identifier, a configuration parameter, and first transmission bearer information.

Optionally, the configuration parameter includes at least one of a TBS, a quantity of PUSCH occasions, a period of a PUSCH occasion, time offset for the first PUSCH occasion, a bandwidth part BWP identifier, and a quantity of hybrid automatic repeat requests HARQs.

Optionally, the first transmission bearer information includes at least one of a radio bearer identifier, a logical channel identifier, a data flow identifier, a session identifier, and a cell group identifier.

Optionally, the second auxiliary information includes at least one of Quality of Service QoS requirement information and service status information.

Optionally, the QoS requirement information includes at least one of a service identifier, a service pattern identifier, QoS description information, and second transmission bearer information; and the second transmission bearer information is used to indirectly indicate a QoS requirement of the terminal.

Optionally, the second transmission bearer information includes at least one of a radio bearer identifier, a data flow identifier, a session identifier, and a logical channel identifier.

Optionally, the service status information includes at least one of a service identifier, a service pattern identifier, a service period, a service starting time, a service ending time, a service duration time, and a service size.

Optionally, a quantity of each of the service starting time, the service ending time, the service duration time, and the service size is one or more.

Optionally, the service starting time is represented by an absolute time and/or a relative time; and the service ending time is represented by an absolute time and/or a relative time.

Optionally, the auxiliary information includes third auxiliary information in a case that the terminal does not need the target configuration, and the third auxiliary information is used to indicate that the target configuration needs to be released.

The apparatus for sending auxiliary information in this embodiment of this application may be an apparatus, or may be a component, an integrated circuit, or a chip in a terminal. The apparatus may be a mobile terminal, or a non-mobile terminal. For example, the mobile device may include but is not limited to the types of the terminal 11 listed above, and the non-mobile terminal may be a server, a network attached storage (Network Attached Storage, NAS), a personal computer (personal computer, PC), a television (television, TV), an automated teller machine, or a self-service machine. This is not specifically limited in the embodiments of this application.

The apparatus for sending auxiliary information in this embodiment of this application may be an apparatus with an operating system. The operating system may be an Android (Android) operating system, an iOS operating system, or another possible operating system, which is not specifically limited in this embodiment of this application.

The apparatus for sending auxiliary information provided in this embodiment of this application can implement the processes implemented in the method embodiments in FIG. 2 to FIG. 4, and achieve a same technical effect. To avoid repetition, details are not described herein again.

Figure 6:
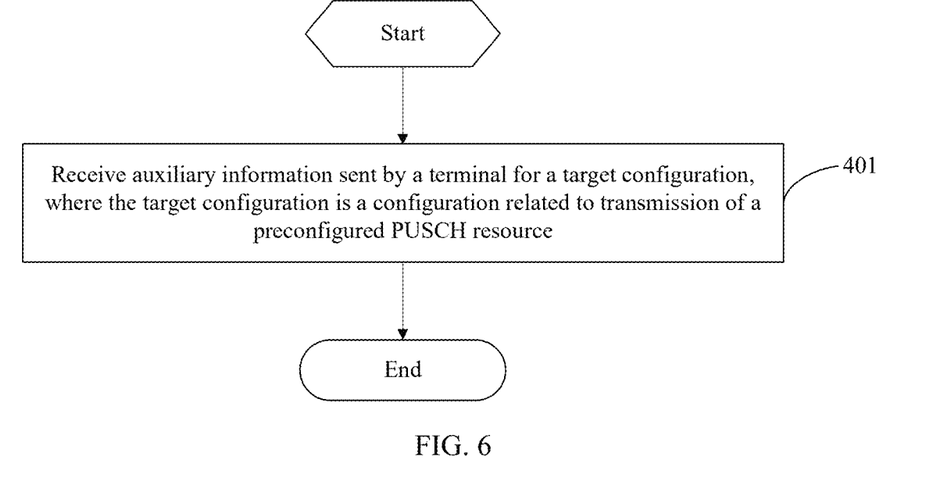
FIG. 6 is a flowchart of a method for receiving auxiliary information according to an embodiment of this application.

FIG. 6 is a flowchart of a method for receiving auxiliary information according to an embodiment of this application. As shown in FIG. 6, the method for receiving auxiliary information is applied to a network side device and includes the following steps.

Step 401: Receive auxiliary information sent by a terminal for a target configuration, where the target configuration is a configuration related to transmission of a preconfigured physical uplink shared channel PUSCH resource.

Optionally, before the receiving auxiliary information sent by a terminal for a target configuration, the method further includes:

sending configuration information to the terminal, where the configuration information is used to indicate whether the terminal is allowed to report the auxiliary information; and the auxiliary information is sent by the terminal in a case that the configuration information indicates that the terminal is allowed to report the auxiliary information.

Optionally, the configuration information includes a target bit, where the target bit is used to indicate whether the terminal is allowed to report the auxiliary information; and/or the configuration information includes information about a target timer, where the target timer is configured to indicate whether the terminal is allowed to report the auxiliary information.

Optionally, an initiation condition for the auxiliary information includes at least one of the following:

the network side device allows the terminal to send the auxiliary information;

the terminal is interested in the target configuration;

the terminal is not interested in the target configuration;

the terminal is no longer interested in the target configuration;

the terminal is interested in a first transmission mode, where the first transmission mode is a transmission mode related to the target configuration;

the terminal is not interested in the first transmission mode;

the terminal is no longer interested in the first transmission mode;

the target configuration does not match a service feature of the terminal;

a medium access control protocol data unit MAC PDU of uplink data is less than or equal to a transport block size TBS configured based on a type of the terminal; and a state of the terminal is a target state, where the target state is a radio resource control RRC connected state or a non-RRC connected state, or the target state is only the RRC connected state, or the target state is only the non-RRC connected state.

Optionally, the auxiliary information includes first auxiliary information and/or second auxiliary information in a case that the terminal needs the target configuration, where the first auxiliary information is used to indicate a tendentious configuration of the terminal for the target configuration, and the second auxiliary information is used to indicate service status of the terminal.

Optionally, the first auxiliary information includes at least one of a target configuration identifier, a service identifier, a service pattern identifier, a configuration parameter, and first transmission bearer information.

Optionally, the configuration parameter includes at least one of a TBS, a quantity of PUSCH occasions, a period of a PUSCH occasion, time offset for the first PUSCH occasion, a bandwidth part BWP identifier, and a quantity of hybrid automatic repeat requests HARQs.

Optionally, the first transmission bearer information includes at least one of a radio bearer identifier, a logical channel identifier, a data flow identifier, a session identifier, and a cell group identifier.

Optionally, the second auxiliary information includes at least one of Quality of Service QoS requirement information and service status information.

Optionally, the QoS requirement information includes at least one of a service identifier, a service pattern identifier, QoS description information, and second transmission bearer information; and the second transmission bearer information is used to indirectly indicate a QoS requirement of the terminal.

Optionally, the second transmission bearer information includes at least one of a radio bearer identifier, a data flow identifier, a session identifier, and a logical channel identifier.

Optionally, the service status information includes at least one of a service identifier, a service pattern identifier, a service period, a service starting time, a service ending time, a service duration time, and a service size.

Optionally, a quantity of each of the service starting time, the service ending time, the service duration time, and the service size is one or more.

Optionally, the service starting time is represented by an absolute time and/or a relative time; and
the service ending time is represented by an absolute time and/or a relative time.

Optionally, the auxiliary information includes third auxiliary information in a case that the terminal does not need the target configuration, and the third auxiliary information is used to indicate that the target configuration needs to be released.

It should be noted that, related implementations and related descriptions in the method embodiments of FIG. 2 to FIG. 4 are all applicable to the embodiments of this application, with the same technical effects achieved. To avoid repetition, details are not described herein again.

It should be noted that, the method for receiving auxiliary information provided in this embodiment of this application may be performed by an apparatus for receiving auxiliary information, or by a control module that is in the apparatus for receiving auxiliary information and that is configured to perform the method for receiving auxiliary information. In this embodiment of this application, that the apparatus for receiving auxiliary information performs the method for receiving auxiliary information is used as an example to describe an apparatus for receiving auxiliary information provided in an embodiment of this application.

Figure 7:
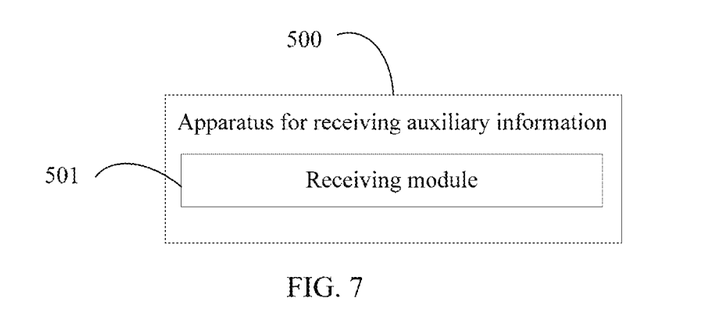
FIG. 7 is a structural diagram of an apparatus for receiving auxiliary information according to an embodiment of this application.

FIG. 7 is a structural diagram of an apparatus for receiving auxiliary information according to an embodiment of this application. As shown in FIG. 7, the apparatus 500 for receiving auxiliary information is applied to a network side device and includes:

a receiving module 501, configured to receive auxiliary information sent by a terminal for a target configuration, where the target configuration is a configuration related to transmission of a preconfigured physical uplink shared channel PUSCH resource.

Optionally, the apparatus 500 for receiving auxiliary information further includes:
 a sending module, configured to send configuration information to the terminal, where the configuration information is used to indicate whether the terminal is allowed to report the auxiliary information; and
 the auxiliary information is sent by the terminal in a case that the configuration information indicates that the terminal is allowed to report the auxiliary information.

Optionally, the configuration information includes a target bit, where the target bit is used to indicate whether the terminal is allowed to report the auxiliary information; and/or the configuration information includes information about a target timer, where the target timer is configured to indicate whether the terminal is allowed to report the auxiliary information.

Optionally, an initiation condition for the auxiliary information includes at least one of the following:
 the network side device allows the terminal to send the auxiliary information;
 the terminal is interested in the target configuration;
 the terminal is not interested in the target configuration;
 the terminal is no longer interested in the target configuration;
 the terminal is interested in a first transmission mode, where the first transmission mode is a transmission mode related to the target configuration;
 the terminal is not interested in the first transmission mode;
 the terminal is no longer interested in the first transmission mode;
 the target configuration does not match a service feature of the terminal;
 a medium access control protocol data unit MAC PDU of uplink data is less than or equal to a transport block size TBS configured based on a type of the terminal; and
 a state of the terminal is a target state, where the target state is a radio resource control RRC connected state or a non-RRC connected state, or the target state is only the RRC connected state, or the target state is only the non-RRC connected state.

Optionally, the auxiliary information includes first auxiliary information and/or second auxiliary information in a case that the terminal needs the target configuration, where the first auxiliary information is used to indicate a tendentious configuration of the terminal for the target configuration, and the second auxiliary information is used to indicate service status of the terminal.

Optionally, the first auxiliary information includes at least one of a target configuration identifier, a service identifier, a service pattern identifier, a configuration parameter, and first transmission bearer information.

Optionally, the configuration parameter includes at least one of a TBS, a quantity of PUSCH occasions, a period of a PUSCH occasion, time offset for the first PUSCH occasion, a bandwidth part BWP identifier, and a quantity of hybrid automatic repeat requests HARQs.

Optionally, the first transmission bearer information includes at least one of a radio bearer identifier, a logical channel identifier, a data flow identifier, a session identifier, and a cell group identifier.

Optionally, the second auxiliary information includes at least one of Quality of Service QoS requirement information and service status information.

Optionally, the QoS requirement information includes at least one of a service identifier, a service pattern identifier, QoS description information, and second transmission bearer information; and the second transmission bearer information is used to indirectly indicate a QoS requirement of the terminal.

Optionally, the second transmission bearer information includes at least one of a radio bearer identifier, a data flow identifier, a session identifier, and a logical channel identifier.

Optionally, the service status information includes at least one of a service identifier, a service pattern identifier, a service period, a service starting time, a service ending time, a service duration time, and a service size.

Optionally, a quantity of each of the service starting time, the service ending time, the service duration time, and the service size is one or more.

Optionally, the service starting time is represented by an absolute time and/or a relative time; and the service ending time is represented by an absolute time and/or a relative time.

Optionally, the auxiliary information includes third auxiliary information in a case that the terminal does not need the target configuration, and the third auxiliary information is used to indicate that the target configuration needs to be released.

Figure 8:
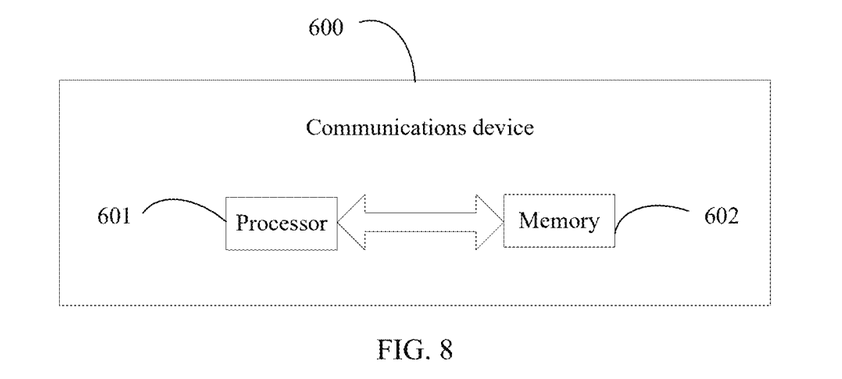
FIG. 8 is a structural diagram of a communications device according to an embodiment of this application.

As shown in FIG. 8, an embodiment of this application further provides a communications device 600, including a processor 601, a memory 602, and a program or an instruction stored in the memory 602 and executable by the processor 601. For example, in a case that the communications device 600 is a terminal, the program or instruction, when executed by the processor 601, implements the processes of the embodiment of the method for sending auxiliary information and achieves a same technical effect. In a case that the communications device 600 is a network side device, the program or instruction, when executed by the processor 601, implements the processes of the embodiment of the method for receiving auxiliary information and achieves a same technical effect. To avoid repetition, details are not described herein again.

Figure 9:
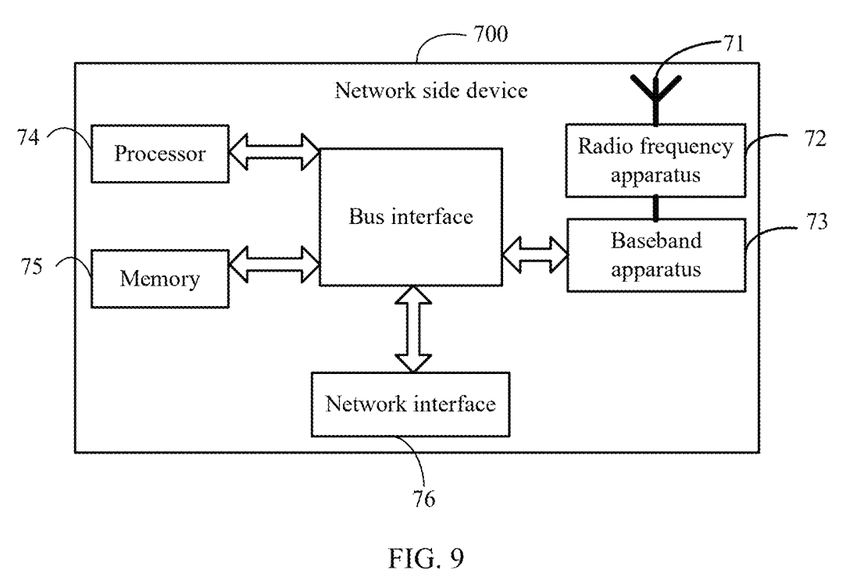
FIG. 9 is a diagram of a hardware structure of a network side device according to an embodiment of this application.

An embodiment of this application further provides a network side device. As shown in FIG. 9, the network side device 700 includes an antenna 71, a radio frequency apparatus 72, and a baseband apparatus 73. The antenna 71 is connected to the radio frequency apparatus 72. In an uplink direction, the radio frequency apparatus 72 receives information by using the antenna 71, and sends the received information to the baseband apparatus 73 for processing. In a downlink direction, the baseband apparatus 73 processes to-be-sent information, and sends the to-be-sent information to the radio frequency apparatus 72. After processing the received information, the radio frequency apparatus 72 sends the information by using the antenna 71.

The frequency band processing apparatus may be located in the baseband apparatus 73. The method performed by the network side device in the above embodiment may be implemented in the baseband apparatus 73. The baseband apparatus 73 includes a processor 74 and a memory 75.

The baseband apparatus 73 may include, for example, at least one baseband board, where a plurality of chips are disposed on the baseband board. As shown in FIG. 7, one chip is, for example, the processor 74, which is connected to the memory 75, so as to invoke a program in the memory 75 to perform operations of the network device shown in the above method embodiment.

The baseband apparatus 73 may further include a network interface 76 for exchanging information with the radio frequency apparatus 72. The interface is, for example, a common public radio interface (common public radio interface, CPRI).

Alternatively, the network side device in this embodiment of the present disclosure further includes an instruction or a program stored in the memory 75 and executable by the processor 74. The processor 74 invokes the instruction or the program in the memory 75 to perform the method performed by the modules shown in FIG. 6, and a same technical effect can be achieved. To avoid repetition, details are not described herein again.

Figure 10:
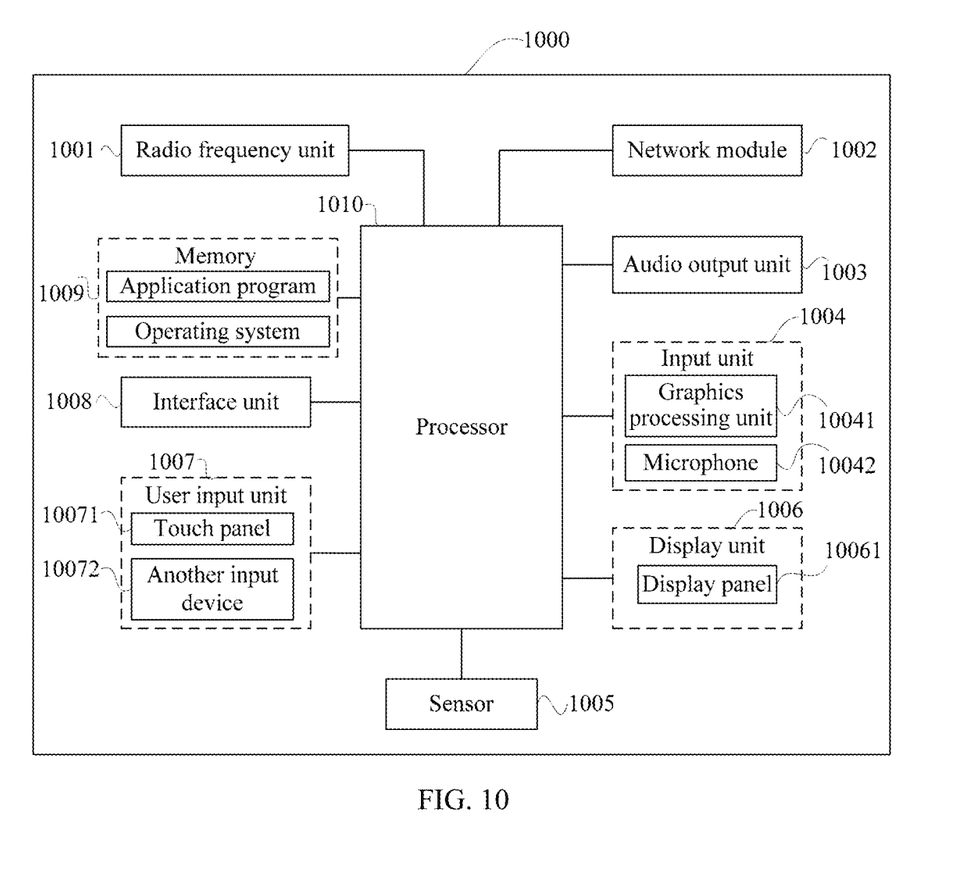
FIG. 10 is a diagram of a hardware structure of a terminal according to an embodiment of this application.

FIG. 10 is a schematic diagram of a hardware structure of a terminal according to an embodiment of this application.

The terminal 1000 includes but is not limited to components such as a radio frequency unit 1001, a network module 1002, an audio output unit 1003, an input unit 1004, a sensor 1005, a display unit 1006, a user input unit 1007, an interface unit 1008, a memory 1009, and a processor 1010.

A person skilled in the art can understand that the terminal 1000 may further include a power supply (for example, a battery) that supplies power to the components. The power supply may be logically connected to the processor 1010 by using a power management system, so as to implement functions such as charging management, discharging management, and power consumption management by using the power management system. The terminal structure shown in FIG. 10 constitutes no limitation on the terminal, and the terminal may include more or fewer components than those shown in the figure, or combine some components, or have different component arrangements. Details are not described herein.

It should be understood that, in the embodiments of this application, the input unit 1004 may include a graphics processing unit (Graphics Processing Unit, GPU) 10041 and a microphone 10042, and the graphics processing unit 10041 processes image data of a still picture or video obtained by an image capture apparatus (such as a camera) in a video capture mode or an image capture mode. The display unit 1006 may include a display panel 10061, and the display panel 10061 may be configured in a form of a liquid crystal display, an organic light-emitting diode, or the like. The user input unit 1007 includes a touch panel 10071 and another input device 10072. The touch panel 10071 is also referred to as a touchscreen. The touch panel 10071 may include two parts: a touch detection apparatus and a touch controller. The another input device 10072 may include but is not limited to a physical keyboard, a functional button (such as a volume control button or a power on/off button), a trackball, a mouse, and a joystick. Details are not described herein.

In this embodiment of this application, the radio frequency unit 1001 receives downlink data from a network side device and then sends the downlink data to the processor 1010 for processing; and sends uplink data to the network side device. Usually, the radio frequency unit 1001 includes but is not limited to an antenna, at least one amplifier, a transceiver, a coupler, a low noise amplifier, a duplexer, and the like.

The memory 1009 may be configured to store a software program or an instruction and various data. The memory 1009 may mainly include a program or instruction storage area and a data storage area. The program or instruction storage area may store an operating system, and an application or an instruction required by at least one function (for example, a sound playing function or an image playing function). In addition, the memory 1009 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. For example, at least one disk storage component, a flash memory component, or another non-volatile solid-state storage component.

The processor 1010 may include one or more processing units. Optionally, an application processor and a modem processor may be integrated into the processor 1010. The application processor mainly processes an operating system, a user interface, an application, an instruction, or the like. The modem processor mainly processes wireless communications, for example, a baseband processor. It can be understood that, alternatively, the modem processor may not be integrated into the processor 1010.

The radio frequency unit 1001 is configured to:
send auxiliary information for a target configuration to a network side device, where the target configuration is a configuration related to transmission of a preconfigured physical uplink shared channel PUSCH resource.

Optionally, the radio frequency unit 1001 is further configured to:
receive configuration information sent by the network side device, where the configuration information is used to indicate whether the terminal is allowed to report the auxiliary information; and
the auxiliary information is sent in a case that the configuration information indicates that the terminal is allowed to report the auxiliary information.

Optionally, the configuration information includes a target bit, where the target bit is used to indicate whether the terminal is allowed to report the auxiliary information; and/or
the configuration information includes information about a target timer, where the target timer is configured to indicate whether the terminal is allowed to report the auxiliary information.

Optionally, the radio frequency unit 1001 is further configured to:
send the auxiliary information for the target configuration to the network side device in a case that an initiation condition is satisfied.

Optionally, the initiation condition includes at least one of the following:
the network side device allows the terminal to send the auxiliary information;
the terminal is interested in the target configuration;
the terminal is not interested in the target configuration;
the terminal is no longer interested in the target configuration;
the terminal is interested in a first transmission mode, where the first transmission mode is a transmission mode related to the target configuration;
the terminal is not interested in the first transmission mode;
the terminal is no longer interested in the first transmission mode;
the target configuration does not match a service feature of the terminal;
a medium access control protocol data unit MAC PDU of uplink data is less than or equal to a transport block size TBS configured based on a type of the terminal; and
a state of the terminal is a target state, where the target state is a radio resource control RRC connected state or a non-RRC connected state, or the target state is only the RRC connected state, or the target state is only the non-RRC connected state.

Optionally, the auxiliary information includes first auxiliary information and/or second auxiliary information in a case that the terminal needs the target configuration, where the first auxiliary information is used to indicate a tendentious configuration of the terminal for the target configuration, and the second auxiliary information is used to indicate service status of the terminal.

Optionally, the first auxiliary information includes at least one of a target configuration identifier, a service identifier, a service pattern identifier, a configuration parameter, and first transmission bearer information.

Optionally, the configuration parameter includes at least one of a TBS, a quantity of PUSCH occasions, a period of a PUSCH occasion, time offset for the first PUSCH occasion, a bandwidth part BWP identifier, and a quantity of hybrid automatic repeat requests HARQs.

Optionally, the first transmission bearer information includes at least one of a radio bearer identifier, a logical channel identifier, a data flow identifier, a session identifier, and a cell group identifier.

Optionally, the second auxiliary information includes at least one of Quality of Service QoS requirement information and service status information.

Optionally, the QoS requirement information includes at least one of a service identifier, a service pattern identifier, QoS description information, and second transmission bearer information; and the second transmission bearer information is used to indirectly indicate a QoS requirement of the terminal.

Optionally, the second transmission bearer information includes at least one of a radio bearer identifier, a data flow identifier, a session identifier, and a logical channel identifier.

Optionally, the service status information includes at least one of a service identifier, a service pattern identifier, a service period, a service starting time, a service ending time, a service duration time, and a service size.

Optionally, a quantity of each of the service starting time, the service ending time, the service duration time, and the service size is one or more.

Optionally, the service starting time is represented by an absolute time and/or a relative time; and the service ending time is represented by an absolute time and/or a relative time.

Optionally, the auxiliary information includes third auxiliary information in a case that the terminal does not need the target configuration, and the third auxiliary information is used to indicate that the target configuration needs to be released.

Optionally, the target configuration is a configuration related to transmission of a preconfigured physical uplink shared channel PUSCH resource.

In this embodiment of this application, a terminal sends auxiliary information for a target configuration to a network side device, where the target configuration is a configuration related to transmission of an uplink resource preconfigured by the network side device. In this way, the terminal can assist, by sending the auxiliary information, the network side device in better configuring the uplink resource. Therefore, the uplink resource configured by the network side device can better satisfy a demand of the terminal.

An embodiment of this application further provides a readable storage medium. The readable storage medium stores a program or an instruction. The program or instruction, when executed by a processor, implements the processes of the method for sending auxiliary information according to the above embodiment or implements the processes of the method for receiving auxiliary information according to the above embodiment, with the same technical effects achieved. To avoid repetition, details are not described herein again.

The processor is a processor in the terminal in the above embodiment. The readable storage medium includes a computer-readable storage medium such as a read-only memory (ROM), a random access memory (RAM), a magnetic disk, an optical disc, or the like.

An embodiment of this application further provides a chip. The chip includes a processor and a communications interface. The communications interface is coupled to the processor. The processor is configured to run a program or an instruction, to implement the processes of the method for sending auxiliary information according to the above embodiment or implement the processes of the method for receiving auxiliary information according to the above embodiment, with the same technical effects achieved. To avoid repetition, details are not described herein again.

It should be understood that the chip mentioned in the embodiment of this application can also be called a system-level chip, a system chip, a chip system, or a system on chip.

It should be noted that, in this specification, the terms "include", "comprise", or their any other variant is intended to cover a non-exclusive inclusion, so that a process, a method, an article, or an apparatus that includes a list of elements not only includes those elements but also includes other elements which are not expressly listed, or further includes elements inherent to such process, method, article, or apparatus. In the absence of more restrictions, an element defined by the statement "including a . . . " does not preclude the presence of other identical elements in the process, method, article, or apparatus that includes the element. In addition, it should be noted that the scope of the method and the apparatus in the embodiments of this application is not limited to performing functions in an illustrated or discussed sequence, and may further include performing functions in a basically simultaneous manner or in a reverse sequence according to the functions concerned. For example, the described method may be performed in an order different from that described, and the steps may be added, omitted, or combined. In addition, features described with reference to some examples may be combined in other examples.

A person of ordinary skill in the art may recognize that, with reference to the examples described in the embodiments disclosed herein, units and algorithm steps may be implemented by electronic hardware or a combination of computer software and electronic hardware. Whether these functions are implemented by using hardware or software depends on the specific application and design constraints of the technical solution. A person skilled in the art may use different methods to implement the described functions for each particular application, but it should not be considered that the implementation goes beyond the scope of the present disclosure.

It may be clearly understood by a person skilled in the art that, for convenience and brevity of description, for a specific working process of the above described system, apparatus, and unit, reference may be made to a corresponding process in the above method embodiments, and details are not described herein again.

In the embodiments provided in this application, it should be understood that the disclosed apparatus and method may be implemented in another manner. For example, the described apparatus embodiment is merely an example. For example, the unit division is merely logical function division. In actual implementation, there may be another division manner. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one place, or may be distributed on multiple network units. Some or all of the units may be selected based on an actual requirement to implement the objectives of the solutions in the embodiments.

In addition, functional units in the embodiments of the present disclosure may be integrated into one processing unit, or each of the units may exist alone physically, or two or more units are integrated into one unit.

Based on the descriptions of the above implementations, a person skilled in the art may clearly understand that the method in the above embodiment may be implemented by software in addition to a necessary universal hardware platform or by hardware only. In most circumstances, the former is a preferred implementation. Based on such understanding, the technical solutions of this application essentially, or the part contributing to the prior art may be implemented in a form of a software product. The computer software product is stored in a storage medium (for example, a ROM/RAM, a magnetic disk, or a compact disc), and includes several instructions for instructing a terminal (which may be a mobile phone, a computer, a server, an air conditioner, a network device, or the like) to perform the method described in the embodiments of this application.

It can be understood that the embodiments described in the present disclosure may be implemented by hardware, software, firmware, middleware, microcode, or a combination thereof. For implementation with hardware, the module, unit, and subunit can be implemented in one or more application specific integrated circuits (ASIC), a digital signal processor (DSP), a DSP device (DSPD), a programmable logic device (PLD), a field-programmable gate array (FPGA), a general-purpose processor, a controller, a micro-controller, a micro-processor, and other electronic units for implementing the functions of the present disclosure, or a combination thereof.

For implementation with software, technologies described in the embodiments of the present disclosure may be implemented by executing functional modules (for example, a process and a function) in the embodiments of the present disclosure. A software code may be stored in the memory and executed by the processor. The memory may be implemented in the processor or outside the processor.

The embodiments of this application are described above with reference to the accompanying drawings, but this application is not limited to the above specific implementations. The above specific implementations are merely schematic instead of restrictive. Under enlightenment of this application, a person of ordinary skills in the art may make many forms without departing from aims and the protection scope of claims of this application, all of which fall within the protection scope of this application.

What is claimed is:

1. A method for sending auxiliary information performed by a terminal, comprising:
sending auxiliary information for a target configuration to a network side device, wherein the target configuration is a configuration related to transmission of a preconfigured physical uplink shared channel (PUSCH) resource;
the auxiliary information comprises second auxiliary information, wherein the second auxiliary information is used to indicate service status of the terminal, and the second auxiliary information comprises Quality of Service (QOS), requirement information;
wherein the QoS requirement information comprises at least one of a service identifier, a service pattern identifier, QoS description information, and second transmission bearer information; and
the second transmission bearer information is used to indirectly indicate a QoS requirement of the terminal, wherein the second transmission bearer information comprises at least one of a radio bearer identifier, a data flow identifier, a session identifier, or a logical channel identifier.

2. The method according to claim 1, wherein before the sending auxiliary information for a target configuration to a network side device, the method further comprises:
receiving configuration information sent by the network side device, wherein the configuration information is used to indicate whether the terminal is allowed to report the auxiliary information; and
the auxiliary information is sent in a case that the configuration information indicates that the terminal is allowed to report the auxiliary information.

3. The method according to claim 2, wherein the configuration information comprises a target bit, wherein the target bit is used to indicate whether the terminal is allowed to report the auxiliary information; and/or
the configuration information comprises information about a target timer, wherein the target timer is configured to indicate whether the terminal is allowed to report the auxiliary information.

4. The method according to claim 1, wherein the sending auxiliary information for a target configuration to a network side device comprises:
sending the auxiliary information for the target configuration to the network side device in a case that an initiation condition is satisfied.

5. The method according to claim 4, wherein the initiation condition comprises at least one of the following:
the network side device allows the terminal to send the auxiliary information;
the terminal is interested in the target configuration;
the terminal is not interested in the target configuration;
the terminal is no longer interested in the target configuration;
the terminal is interested in a first transmission mode, wherein the first transmission mode is a transmission mode related to the target configuration;
the terminal is not interested in the first transmission mode;
the terminal is no longer interested in the first transmission mode;
the target configuration does not match a service feature of the terminal;
a medium access control protocol data unit (MAC PDU) of uplink data is less than or equal to a transport block size (TBS) configured based on a type of the terminal; or
a state of the terminal is a target state, wherein the target state is a radio resource control (RRC) connected state or a non-RRC connected state, or the target state is only the RRC connected state, or the target state is only the non-RRC connected state.

6. The method according to claim 1, wherein the auxiliary information further comprises first auxiliary information, wherein the first auxiliary information is used to indicate a tendentious configuration of the terminal for the target configuration.

7. The method according to claim 6, wherein the first auxiliary information comprises at least one of a target configuration identifier, a service identifier, a service pattern identifier, a configuration parameter, or first transmission bearer information.

8. The method according to claim 7, wherein the configuration parameter comprises at least one of a TBS, a quantity of PUSCH occasions, a period of a PUSCH occasion, time offset for the first PUSCH occasion, a bandwidth part (BWP) identifier, or a quantity of hybrid automatic repeat requests (HARQs),
wherein the first transmission bearer information comprises at least one of a radio bearer identifier, a logical channel identifier, a data flow identifier, a session identifier, or a cell group identifier.

9. The method according to claim 6, wherein the second auxiliary information further comprises service status information.

10. The method according to claim 9, wherein the service status information comprises at least one of a service identifier, a service pattern identifier, a service period, a service starting time, a service ending time, a service duration time, or a service size.

11. The method according to claim 10, wherein a quantity of each of the service starting time, the service ending time, the service duration time, and the service size is one or more.

12. The method according to claim 10, wherein the service starting time is represented by an absolute time and/or a relative time; and
the service ending time is represented by an absolute time and/or a relative time.

13. The method according to claim 1, wherein the auxiliary information comprises third auxiliary information, and the third auxiliary information is used to indicate that the target configuration needs to be released.

14. A method for receiving auxiliary information performed by a network side device, comprising:
receiving auxiliary information sent by a terminal for a target configuration, wherein the target configuration is a configuration related to transmission of a preconfigured physical uplink shared channel (PUSCH) resource;
the auxiliary information comprises second auxiliary information, wherein the second auxiliary information is used to indicate service status of the terminal, and the second auxiliary information comprises Quality of Service (QOS), requirement information;
wherein the QoS requirement information comprises at least one of a service identifier, a service pattern identifier, QoS description information, and second transmission bearer information; and the second transmission bearer information is used to indirectly indicate a QoS requirement of the terminal, wherein the second transmission bearer information comprises at least one of a radio bearer identifier, a data flow identifier, a session identifier, or a logical channel identifier.

15. The method according to claim 14, wherein before the receiving auxiliary information sent by a terminal for a target configuration, the method further comprises:

sending configuration information to the terminal, wherein the configuration information is used to indicate whether the terminal is allowed to report the auxiliary information; and the auxiliary information is sent by the terminal in a case that the configuration information indicates that the terminal is allowed to report the auxiliary information.

16. The method according to claim 15, wherein the configuration information comprises a target bit, wherein the target bit is used to indicate whether the terminal is allowed to report the auxiliary information; and/or the configuration information comprises information about a target timer, wherein the target timer is configured to indicate whether the terminal is allowed to report the auxiliary information.

17. A terminal, comprising:

a processor; and a memory storing a program or an instruction that is executable by the processor, wherein the program or instruction, when executed by the processor, causes the terminal to:

send auxiliary information for a target configuration to a network side device, wherein the target configuration is a configuration related to transmission of a preconfigured physical uplink shared channel (PUSCH) resource;

the auxiliary information comprises second auxiliary information, wherein the second auxiliary information is used to indicate service status of the terminal, and the second auxiliary information comprises Quality of Service (QOS), requirement information;

wherein the QoS requirement information comprises at least one of a service identifier, a service pattern identifier, QoS description information, and second transmission bearer information; and the second transmission bearer information is used to indirectly indicate a QoS requirement of the terminal, wherein the second transmission bearer information comprises at least one of a radio bearer identifier, a data flow identifier, a session identifier, or a logical channel identifier.

18. A network side device, comprising:

a processor; and a memory storing a program or an instruction that is executable by the processor, wherein the program or instruction, when executed by the processor, causes the network side device to perform the method for receiving auxiliary information according to claim 14.

\* \* \* \* \*